Oct. 7, 1969  G. M. FARRELL ET AL  3,471,663
STRING-OPERATED SWITCH CONSTRUCTION
Filed May 16, 1967  6 Sheets-Sheet 1

INVENTORS
Guy M. Farrell, Richard B. Gaber,
Matthew C. Podgorski & Morris N. Whitlock
by McDougall, Hersh, Scott and Ladd
Attorneys

Oct. 7, 1969    G. M. FARRELL ET AL    3,471,663
STRING-OPERATED SWITCH CONSTRUCTION
Filed May 16, 1967    6 Sheets-Sheet 4

United States Patent Office

3,471,663
Patented Oct. 7, 1969

3,471,663
STRING-OPERATED SWITCH CONSTRUCTION
Guy M. Farrell, Elmhurst, Richard B. Gaber, Crystal Lake, Matthew C. Podgorski, Wood Dale, and Morris N. Whitlock, Elmhurst, Ill., assignors to F & F Enterprises Inc., Chicago, Ill., a corporation of Illinois
Filed May 16, 1967, Ser. No. 638,877
Int. Cl. H01h 15/18, 21/04, 15/00
U.S. Cl. 200—76
9 Claims

ABSTRACT OF THE DISCLOSURE

A switch construction having stationary contacts mounted on a base, a movable contact and an actuator member for shifting the position of the movable contact. An over-center spring is interposed between the actuator member and the movable contact, and the spring is connected for pivotal movement as the actuator member is shifted from one position to another. In the operation of the switch construction the spring initially resists movement from the position in which it is set when the actuator member first begins to shift its position. Continued movement of the actuator member causes operation of the over-center spring at which time the movable contact is shifted from one position to another, the shifting being characterized by rapid disconnect and by wiping action against at least some of the stationary contacts.

---

This invention relates to an improved switch construction. In particular, the invention is concerned with a switch construction which operates through the use of spring means to provide the primary making and breaking action of the switch.

In certain highly sophisticated electrical circuits, extreme limitations are placed on switch characteristics. Thus, many applications involving the use of switches require an extremely high degree of reliability while also requiring near perfect switch operation. The requirements usually involve extremely rapid switch operation whereby arcing is virtually eliminated. "Tease proof" switches are often required since some circuits cannot tolerate even minor changes in resistance which might occur when switch contacts are partially or gradually separated. Finally, any contamination of the contact surfaces must be kept to a minimum since even minor amounts of such contamination can disrupt highly sensitive operations, for example by increasing the resistance. All of these problems are magnified when miniature switches must be provided. Various applications, such as in space technology, require switches having minimum size and weight while at the same time requiring extremely efficient and reliable operation.

It is a general object of the instant invention to provide a switch construction which will operate reliably under severe circuit conditions and which is adapted to be manufactured in extremely small sizes.

It is a more particular object of this invention to provide a switch construction which is "tease proof" whereby rapid connect and disconnect operations can be achieved so that significant changes in resistivity or other electrical characteristics will not occur even for a short duration.

It is a still further object of this invention to provide a switch of the type described which is characterized by extreme reliability in that the switch automatically provides a wiping action in its operation so that there is a minimum danger of contamination of the switch contact area.

These and other objects of this invention will appear hereinafter and for purposes of illustration, but not of limitation, specific embodiments of this invention are shown in the accompanying drawings in which.

The construction of this invention generally comprises a base which supports at least one stationary contact. A movable contact element is positioned adjacent the base and the improvements of the instant invention are particularly concerned with means actuating this movable contact element.

The actuating means generally comprise an over-center spring arrangement connected at one end to a sliding actuator member. The other end of the spring is operatively connected for pivoting movement relative to the movable contact element. Sliding movement of the actuator member operates to shift the movable contact element whereby making and/or breaking of the switch contacts can be achieved.

Switch designs incorporating the features of this invention are characterized by certain extremely advantageous operating features. Specifically, the movement imparted to the movable contact element may be such that virtually instantaneous disconnect of contacts is achieved when a breaking of the contact elements is involved. When the movable and stationary contacts are closed in the circuit, a wiping action inherently occurs thereby providing an additional advantageous feature. This wiping action virtually eliminates any possibility of contamination of the contact surfaces. This feature is extremely important from the standpoint of reliable circuit operation since even minute changes in resistance or the like can adversely affect such operations.

The accompanying drawings illustrate various alternative switch arrangements which incorporate the advantageous features of this invention. FIGURES 1 through 7 illustrate a switch 10 which includes a housing 12 mounted on a base 14. Stationary contacts 16 are secured to this base, and terminals 18 provide for inclusion of these contacts in an electrical circuit.

Figure 4:
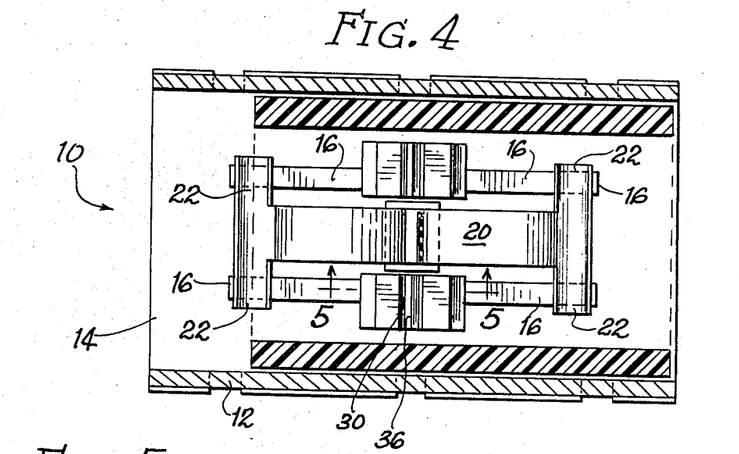
FIGURE 4 is a horizontal sectional view taken about the line 4—4 of FIGURE 1.

A movable contact element 20 is located in position above the stationary contacts. As best shown in FIGURE 4, the movable contact element includes extensions 22 at either end for engagement with stationary contacts 16. The movable contact, thus, provides a bridge completing a circuit between the contacts at either end of the switch.

The bridging type switch described only represents one possible application for the arrangement of this invention. Since the movable contact 20 can be a conductor throughout its entire length, a single stationary contact 16 could be provided at either end of the switch with a common connection being made with the contact element 20. It is also possible to eliminate the stationary contacts from one end of the switch whereby the switch will always be open in one position and closed in the other position. The features of the instant invention relate primarily to the means for effecting the switch movements rather than to the particular contact arrangements employed.

The movable contact element 20 defines a centrally located bend 24 which serves as a seat for a pivot plate 26. The pivot plate 26 includes a pair of legs 28 which are received in V-shaped recesses 30 defined by blocks 32. These blocks are formed integrally with the base 14.

Figures 5, 6:
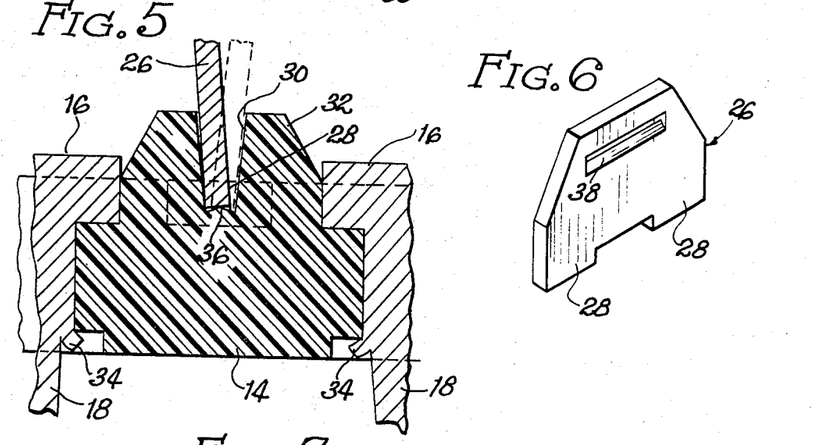
FIGURE 5 is an enlarged fragmentary sectional view taken about the line 5—5 of FIGURE 4.
FIGURE 6 is a perspective view illustrating a pivoting member employed in the switch construction.
Figure 7:
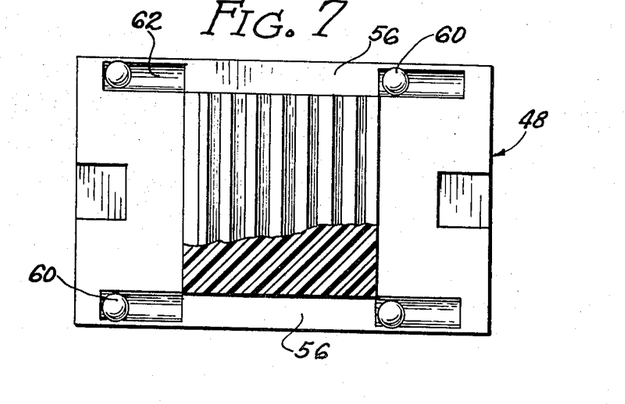
FIGURE 7 is a plan view, partly cut away, illustrating a sliding actuator member employed in the construction of FIGURE 1.
Figure 8:
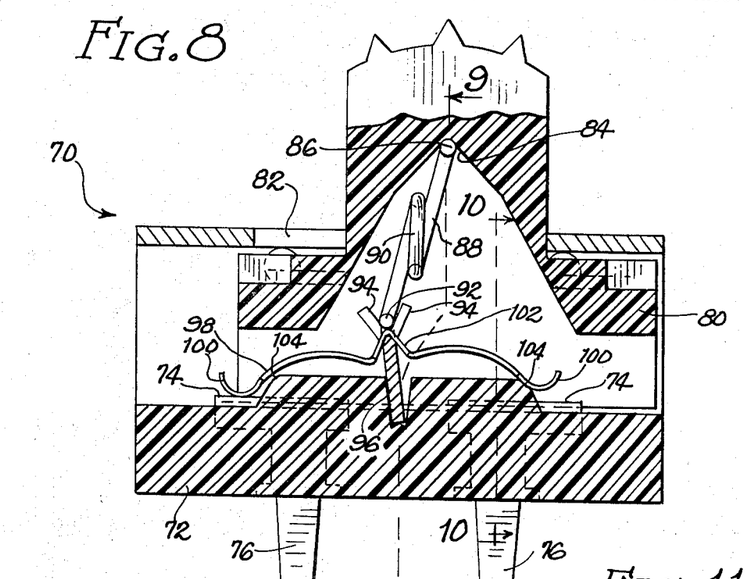
FIGURE 8 is a side elevational view, partly cut away, of a modified form of the invention.
Figure 9:
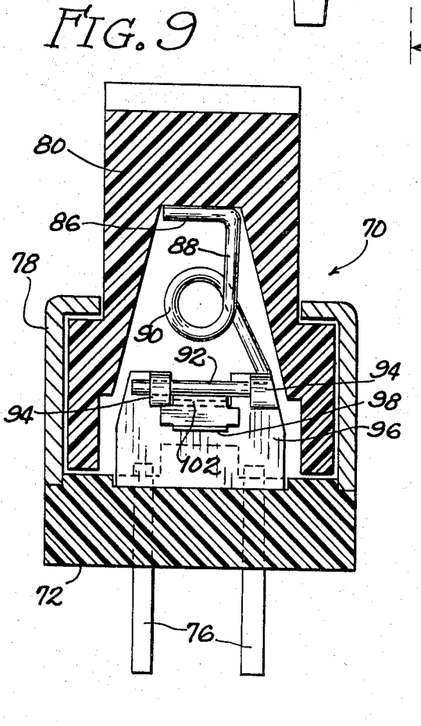
FIGURE 9 is a vertical sectional view taken about the line 9—9 of FIGURE 8.
Figure 10:
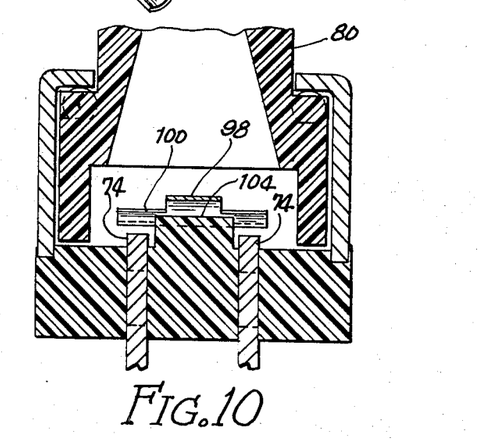
FIGURE 10 is a fragmentary sectional view taken about the line 10—10 of FIGURE 8.
Figure 11:
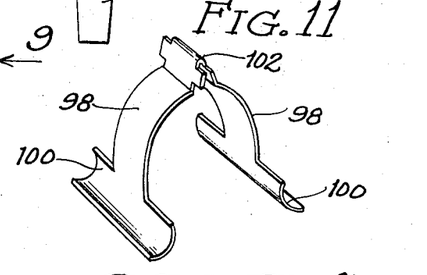
FIGURE 11 is a perspective view of a bridging contact element employed in the construction shown in FIGURE 8.

A rise 36 is defined at the base of the V-shaped grooves 30. This provides a fulcrum for the bottom surface of the legs 28 of the pivot plate. As shown in FIGURE 5, the legs of the pivot plate actually shift sidewise within the groove when the plate is pivoted from one position to the other. It will also be noted that the pivot plate is positioned against the side walls of the groove whereby these side walls act as limiting means for the pivotal movement.

The pivot plate 26 defines a slot 38 which receives the end 40 of an over-center spring 42. This spring comprises a strip of metal, preferably spring steel. The upper end 44 of the spring seats within a recess 46 defined by an interior surface of a switch actuator button 48. This switch actuator comprises a slideable member having a hollowed out portion 50 within the confines of the housing 12. The upper end of the actuator extends outwardly through an opening 52 of the housing whereby the actuator can be engaged for manual operation or for mechanical operation through the use of some other actuating means. The housing defines in-turned flanges 54 which are positioned over shoulders 56 defined by the actuator 48. Anti-friction balls 60 are included in pockets 62 defined by the actuator whereby smooth reciprocation of the actuator can be achieved.

Figure 1:
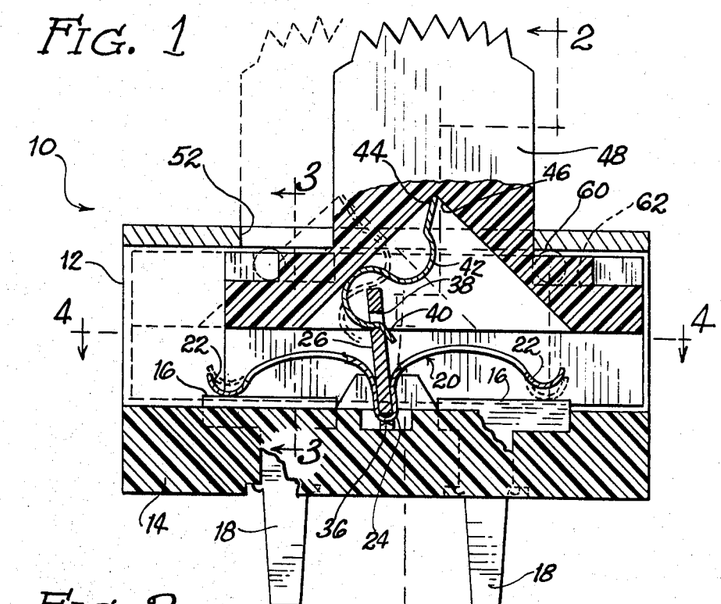
FIGURE 1 is a side elevation, partly cut away, of a switch construction characterized by the features of this invention.
Figure 2:
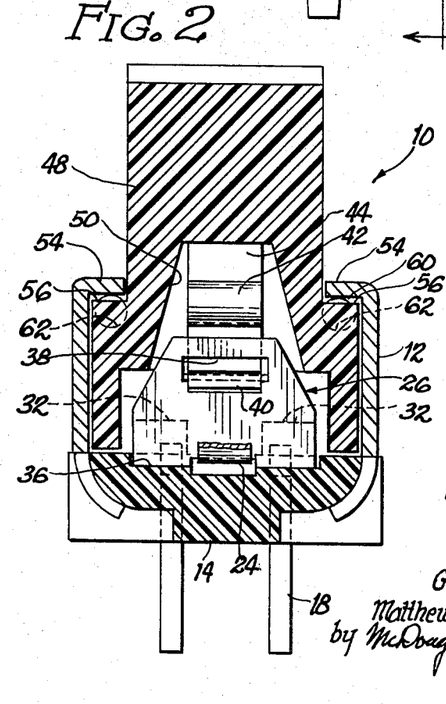
FIGURE 2 is a vertical sectional view taken about the line 2—2 of FIGURE 1.
Figure 3:
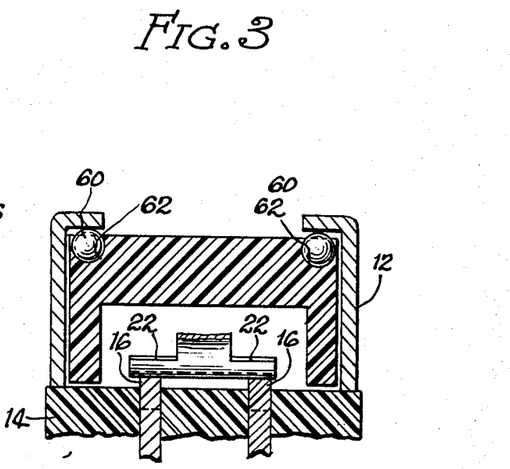
FIGURE 3 is a fragmentary sectional view taken about the line 3—3 of FIGURE 1.

In the operation of the switch 10, the movable contact element 20 shifts between the positions illustrated in FIGURE 1. Thus, the solid line showing illustrates the left-hand contacts in the closed position while the dotted line showing illustrates the right-hand contacts in the closed positions. To achieve switching action, the actuator 48 first moves in opposition to the spring 42. In considering FIGURE 1, it will be noted that initial movement of the actuator 48 to the left will shorten the distance between the groove 46 and the slot 38 whereby the spring 42 will actually tend to increase the contact at the left side of the switch.

Actual switching does not take place until the actuator 48 has moved beyond its center position. When such switching takes place, there is a snap action which will result in instantaneous opening of one set of contacts and instantaneous closing of the other set of contacts. There is no lag period during which the pressure of the closed contacts gradually decreases. Even a small amount of gradual decrease in pressure can result in a time period of increasing resistance. In very sensitive circuits, such gradual changes can disrupt proper operation. Accordingly, the instantaneous disconnect which characterizes this invention is of extreme importance.

The switch operation is also characterized by a highly important wiping action. It will be noted that a small increment of sliding movement will take place during making of contacts. Thus, the configuration of the movable contacts 20 combined with the pressure exerted by the spring 42 will result in some bending movement whereby the contacting surfaces will experience relative movement between the instant of first contact and the final position. It is important to note, however, that with the instant arrangement, such wiping action only takes place during making of contacts. The action achieved by the spring 42 results in instantaneous lifting of contacts during breaking whereby no significant wiping action will occur thereby eliminating any false resistance changes in a circuit.

FIGURES 8 through 11 illustrate an alternative switch design 70 comprising a base 72 carrying stationary contacts 74 and having terminals 76 extending therefrom. A housing 78 is attached to the base, and a sliding actuator 80 includes a lower portion fitted within this housing. An opening 82 of the housing receives the operating portion of the actuator.

The actuator includes an interior recess 84 which provides a seat for the bent-over end 86 of wire spring 88. This spring includes a central loop 90 and a lower end 92 which fits within a seat provided by arms 94 carried by pivot plate 96. A movable contact element 98 includes bridging contact portions 100 for engagement with stationary contacts 74. The movable contact element includes a central bend 102 which fits over a recess defined by the pivot plate between the arms 94.

The operation of the switch 70 corresponds with the operation described relative to the switch 10. The initial switching movement does not create conditions which would result in any significant change in resistance but, as the movement progresses beyond the midway point, the desired snap action and instantaneous disconnect occurs. Similarly, the wiping action will occur as the other contact position becomes closed.

The base 72 defines a pair of shoulders 104 immediately adjacent the stationary contacts 74. It will be noted that the bridging portion of the contact element 98 is held away from the contacts 94 on the open side of the switch. This provides a positive means for preventing any shorting action which might occur, for example, if the contact element 98 did not have suitable inherent spring action for maintaining the contacts apart on the open side of the switch.

Figure 12:
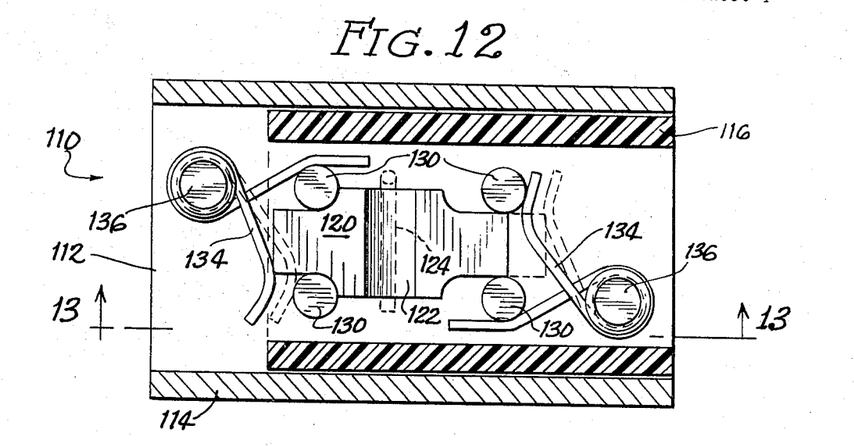
FIGURE 12 is a horizontal sectional view of an alternative switch construction taken about the line 12—12 of FIGURE 13.
Figure 13:
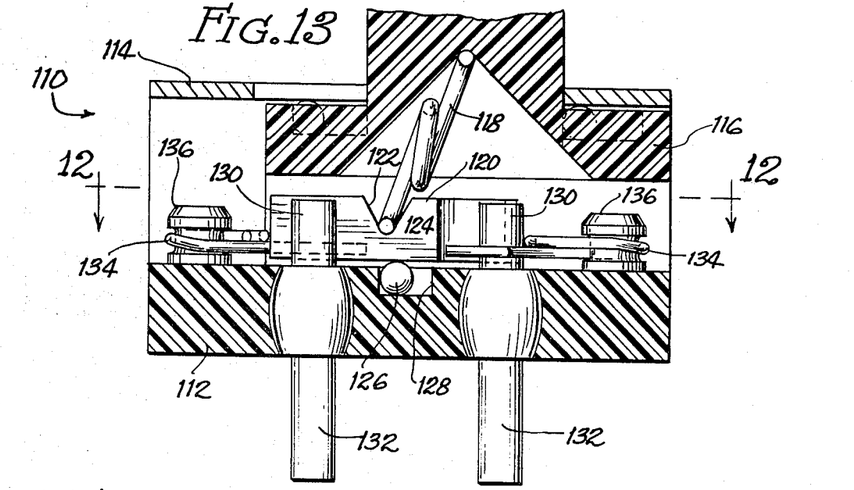
FIGURE 13 is a vertical sectional view taken about the line 13—13 of FIGURE 12.

FIGURES 12 and 13 illustrate an additional switch construction 110 comprising a base 112 and a housing 114. An actuator 116 is slideably positioned within the housing. This actuator is adapted to move contact elements in conjunction with over-center spring 118 and sliding block 120. The spring 118 is of the same design as of the spring 88 shown in FIGURES 8 and 9.

The sliding block includes a V-shaped groove 122 for receiving the lower end 124 of the spring. A bearing 126 may be inserted in pocket 128 to facilitate movement of this sliding block.

The block is adapted to move back and forth between posts 130 which comprise stationary contact elements and which also serve as stop members for the block 120. The posts 130 are provided with terminal extensions 132 of the type suitable for association with a printed circuit board. It will be understood in this connection that the switches of this invention are ideally suited for association with printed circuit boards although other types of terminals can be readily employed for the switches.

A conductive wire 134 is located around a post 136 at each end of the switch. The ends of the wire comprise contacts and the wire has spring characteristics whereby these ends are always pressed toward the respective stationary contacts.

The switch 110 always allows one of the wires 134 to bridge a set of contacts 130 while the block 120 holds one end of the other wire 134 out of engagement with the adjacent stationary contact. The switch operation is essentially the same as described above with respect to the switches 10 and 70. The movement of the actuator beyond a midpoint results in a snap action providing immediate disconnect at the closed end of the switch while making the other end of the switch. An increment of wiping action takes place during the closing of the contacts.

The switch construction 110 of FIGURES 12 and 13 incorporates an ideal snap action in that normally closed contacts are employed. Thus, the sliding block 120 does not effect a change in the switch condition until the end of its shifting movement. It is not possible to "tease" a switch of this type since the beginning of the switching operation cannot ocur until after the over-center spring has started the sliding block on its way to the new position. Where normaly open contacts are employed, there is some possibility that a momentary relief in pressure on the closed contacts could take place as the over-center spring begins the shifting action. All structures of this invention are designed to eliminate this possibility; however, the provision of normally closed contacts is ideal in this regard.

Figure 14:
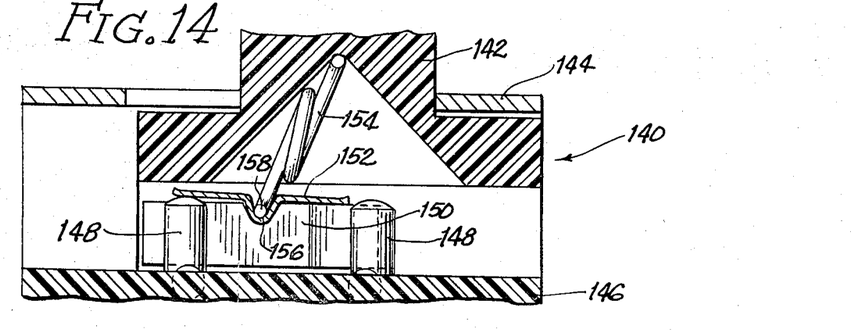
FIGURE 14 is a fragmentary sectional view illustrating a further alternative form of the invention.

A further alternate arrangement comprises a switch 140 illustrated in FIGURE 14. This switch includes an actuator 142 movable with respect to housing 144. The base 146 carries stationary contact 148 while a sliding block 150 carries a movable contact element 152. The over-center spring 154 provides snap action movement of the contact element when the actuator is moved beyond the midpoint of the allowed reciprocal movement. The movable contact 152 comprises a resilient member which presses against the top surfaces of the stationary contacts during making of the switch.

The movable contact element defines a central recess 156 which is received within a corresponding recess defined by the block 150. This provides an extremely simple means for assembling the switch, particularly with respect to including the end 158 of the switch in the recess 156.

The contact element 152 may provide a bridging action with respect to a pair of stationary contacts 148. It has been found that the switch arrangement of FIGURE 14 is advantageous due to the ideal wiping characteristics which are achieved on both sides of the switch each time a switching operation takes place. When this is combined with the snap action provided by the switch whereby rapid disconnect is achieved, the switch can be employed in very sophisticated electrical circuits. The switch of FIGURE 14 is also extremely desirable since its simplified construction permits manufacture in extremely small sizes.

Figure 15:
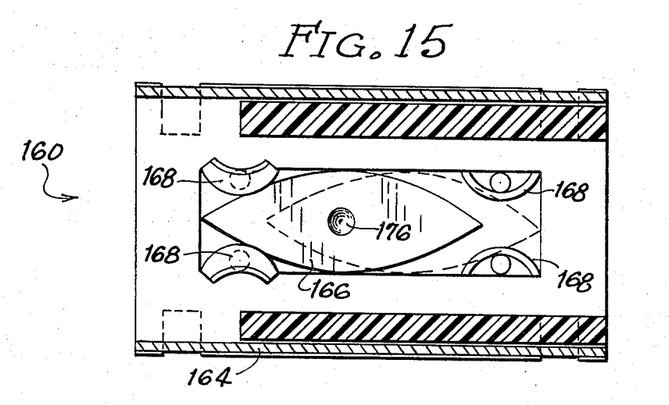
FIGURE 15 is a horizontal sectional view of an alternative form of the switch construction.
Figures 16, 17, 18:
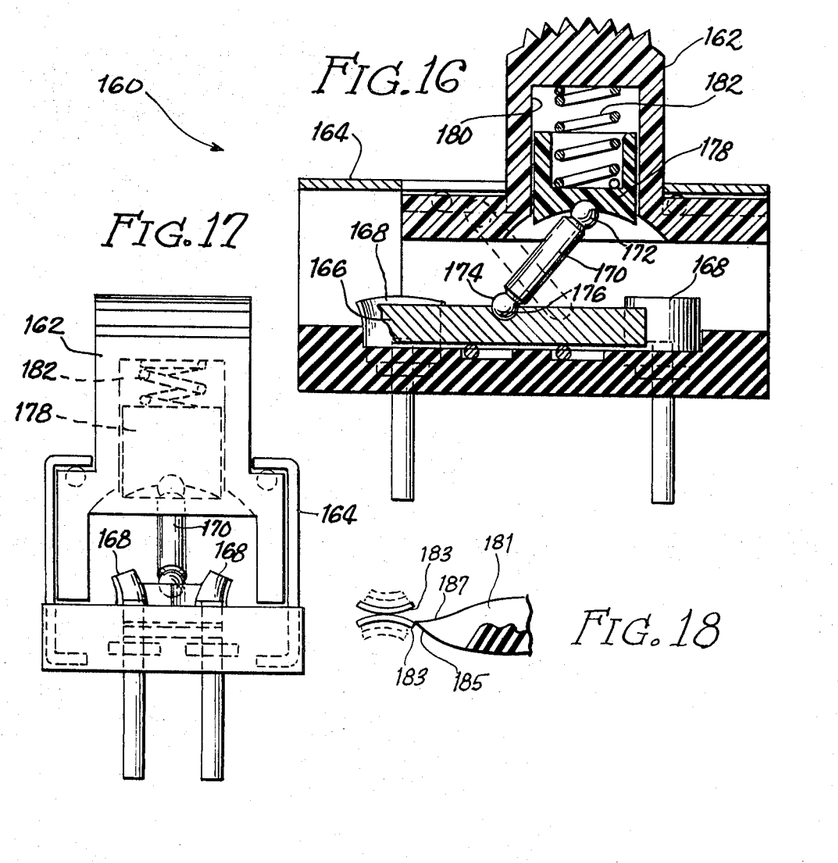
FIGURE 16 is a vertical sectional view of the construction shown in FIGURE 15.
FIGURE 17 is an end elevation of the construction shown in FIGURES 16 and 17.
FIGURE 18 illustrates a modified form of the invention wherein "half-clip" contacts are provided in a normally closed position whereby the contacts will be broken by a movable contact block.

FIGURES 15 through 17 illustrate a further form 160 of a switch construction embodying the concepts of this invention. The construction includes a sliding actuator 162 reciprocally mounted within housing 164. An elliptically shaped contact block 166 is adapted to shift back and forth between stationary contact 168 whereby one pair of opposed contacts will be bridged depending upon the position of the block 166.

The over-center switch arrangement of the construction of FIGURES 15 through 17 comprises a solid pin 170 having rounded ends 172 and 174. The lower end 174 is seated in the hemispherical recess 176 formed in the block 166. The upper end 172 is positioned in a similar recess formed in the botom end of piston 178. The piston 178 is included within an opening 180 defined by the actuator 162. A spring 182 normally urges the piston downwardly.

The respective parts are dimensioned such that the piston 178 will constantly apply pressure to the pin 170 whereby the pin will always be held in position between the piston and the block 166. In the position of the switch shown, the left-hand contacts 168 are bridged, and it will be appreciated that the spring action is always forcing the block 166 into engagement with these left-hand stationary contacts. When switching action is to take place, movement of the actuator 162 will initially result in continued application of pressure between the block 166 and the left-hand contacts 168. Rapid disconnect will occur when an overcenter position is reached at which time the switch will assume the position shown in dotted lines in FIGURES 15 and 16.

The contacts 168 preferably comprise a "half-clip" design. Thus, the contacts are formed of a flexible piece of metal in semi-cylindrical form. When the block 166 moves between the contacts, they bend rearwardly in the manner shown. This provides an ideal pressure engagement with the conductive block, and it also insures better wiping action.

FIGURE 18 illustrates an arrangement wherein an insulating block 181 is adapted to force its way between normally closed "half-clip" contacts 183. The "half-clip" contacts are ideally suited for a construction of this type wherein complete elimination of teasing can be accomplished as discussed with reference to FIGURE 12.

It will be noted that the leading end of the block 181 is out of alignment with respect to the contact point of the normally closed contacts. With an arrangement of this type, the edge 185 will engage one contact before the opposite edge 187 engages the other contact. This unequal action provides ideal wiping characteristics.

Figure 19:
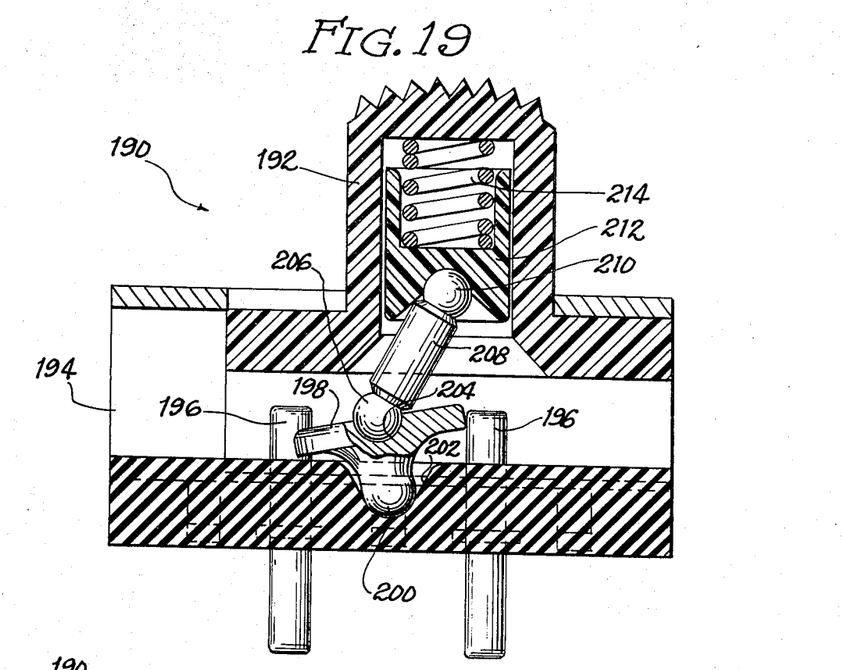
FIGURE 19 is a vertical sectional view of an additional form of the switch construction.
Figure 20:
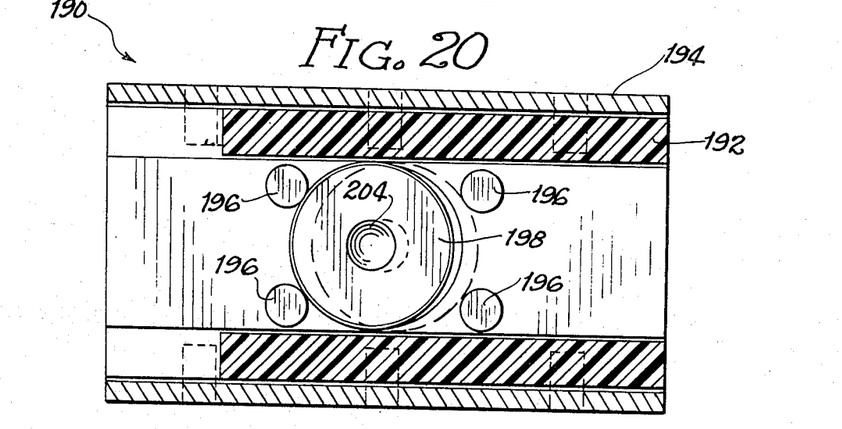
FIGURE 20 is a horizontal sectional view of the construction shown in FIGURE 18.

The embodiment of the invention shown in FIGURES 19 and 20 comprises a switch 190 having an actuator 192 mounted within a housing 194. Stationary contacts 196 are adapted to be bridged by movable contact element 198.

The movable contact comprises an upper portion in the form of a disc, and a downwardly extending ball-shaped lower portion 200. This lower portion is seated within recess 202 for rocking movement between the respective pairs of stationary contacts.

A hemispherical recess 204 formed in the top of the contact 196 receives the rounded end 206 of pin 208. The upper end 210 of this pin is seated within a similar recess formed in the bottom of piston 212. Spring 214 normally urges the piston downwardly to insure constant application of pressure.

The operation of the switch 190 essentially corresponds with the operation described with reference to the switch 160. The over-center spring principal embodied in the switch 190 provides for rapid disconnect as well as wiping action, particularly during closing of the switch.

The operating characteristics of the switch constructions described are highly desirable when considering the problems which can arise during "teasing" of a switch; where the switch actuator is wiggled back and forth without actually accomplishing enough movement to achieve switching action. In a normal switch operation, such "teasing" can result in distinct changes in resistance without a break in the circuit taking place. The over-center operation of this invention eliminates this undesirable situation since movement of the actuating button before reaching the over-center position does not result in any resistance increase. When the over-center position is reached, the disconnect is rapid so that "teasing" or undesirable variations do not occur at this time.

It will be understood that various changes and modifications may be made in the above described switch constructions which provide the characteristics of this That which is claimed is:

1. In a switch construction including a base, at least one stationary contact associated with said base, and a contact element movable relative to said stationary contact, the improvement comprising actuating means associated with said movable contact element, said actuating means comprising an over-center spring, a sliding actuator member, a recess defined in the underside of said actuator member for receiving one end of said spring, a pivotally mounted rocker, means defined at one end of said rocker for receiving the other end of said spring, the respective ends of said spring bearing against said actuator member and said rocker without being tied thereto to provide freedom of movement, a seat defined by said movable contact element with the opposite end of said rocker engaging said seat, said movable contact element comprising a spring with at least one end resiliently pressing into engagement with a stationary contact in one position of said switch, said movable contact element being adapted to slide over the top surface of said stationary contact during making of the switch while being pressed into engagement with said stationary contact, sliding movement of said actuator member causing said movable contact element to initially, positively increase the pressure of its resilient engagement with said stationary contact and to thereby resist movement from the position in which it is set, and continued movement from the position in which it is set, and continued movement of said actuator member resulting in operation of said overcenter spring to force shifting movement of the contact element, said shifting movement resulting in disconnection of contacts where breaking of contacts is involved, and being characterized by wiping of the movable contact element against the stationary contact element where making of contacts is involved.

2. In a switch construction including a base, at least one stationary contact associated with said base, and a contact element movable relative to said stationary contact, the improvement comprising actuating means associated with said movable contact element, said actuating means comprising an over-center spring, a sliding actuator member connected to one end of said spring, and means pivotally connecting the other end of said spring to said movable contact element, said other end to said spring seating in a V-shaped recess to provide said pivotal connection, the opposed side walls of said recess serving as stop means limiting the pivoting movement of said spring, sliding movement of said actuator member causing said movable contact element to initially, positively resist movement from the position in which it is set, and continued movement of said actuator member resulting in operation of said over-center spring to force shifing movement of the contact element, said shiftting movement resulting in disconnection of contacts where breaking of contacts is involved, and being characterized by wiping of the movable contact element against the stationary contact element where making of contacts is involved.

3. A construction in accordance with claim 1 including a housing for said switch, said sliding actuator member including portions located within said housing and at least partially enclosing said movable contact element, and an additional portion of said sliding actuator member extending outwardly of the housing for engagement of the sliding actuator member to provide for movement of said movable contact element.

4. A construction in accordance with claim 3 including flange means defined by said housing, corresponding shoulder means defined by said sliding actuator member, and bearings interposed between said flange means and said shoulder means to facilitate movement of said sliding actuator member.

5. A construction in accordance with claim 4 wherein said spring operates to press said sliding actuator member against said bearings.

6. A construction in accordance with claim 1 wherein said base defines shoulder members immediately adjacent said stationary contacts, said shoulder members being adapted to hold said movable contact element out of contact with an adjacent stationary contact when said sliding outer member is in a retracted position.

7. A construction in accordance with claim 1 wherein said spring comprises a wire element having a central loop and bent-over ends defined by the spring providing means for seating of the spring within the construction.

8. A construction in accordance with claim 1 wherein said spring comprises a strip having a curvilinear cross section, the respective ends of said strip defining a configuration for seating with respect to said sliding actuator member and with respect to said pivotal connection.

9. A construction in accordance with claim 1 wherein said movable contact element is pivotally connected to said base whereby the movable contact element is adapted to be rocked back and forth for movement into and out of contact with said stationary contacts.

References Cited

UNITED STATES PATENTS

| | | |
|---|---|---|
| 2,171,368 | 8/1939 | Krieger. |
| 2,215,319 | 9/1940 | Brown. |
| 2,315,035 | 3/1943 | Andis. |
| 2,566,720 | 9/1951 | Dissinger _________ 200—76 |
| 2,686,234 | 8/1954 | Obszarny _________ 200—68 |
| 2,695,933 | 11/1954 | Daily et al. _________ 200—16 |
| 2,727,956 | 12/1955 | Winter. |
| 2,749,400 | 6/1956 | Chichester. |
| 2,932,698 | 4/1960 | Barden. |
| 3,035,134 | 5/1962 | Hults. |
| 3,290,463 | 12/1966 | Johnson _________ 200—76 |
| 3,296,389 | 1/1967 | Hults _________ 200—16 |

FOREIGN PATENTS

| | | |
|---|---|---|
| 840,112 | 4/1952 | Germany. |
| 924,008 | 4/1963 | Great Britain. |
| 957,644 | 4/1964 | Great Britain. |

ROBERT K. SCHAEFER, Primary Examiner

D. SMITH, Jr., Assistant Examiner

U.S. Cl. X.R.

200—16, 67

UNITED STATES PATENT OFFICE
CERTIFICATE OF CORRECTION

Patent No. 3,471,663                                    October 7, 1969

Guy M. Farrell et al.

It is certified that error appears in the above identified patent and that said Letters Patent are hereby corrected as shown below:

In the heading to the drawings and printed specification, title of invention, "STRING-OPERATED SWITCH CONSTRUCTION", each occurrence, should read -- SNAP ACTION SWITCH WITH SPRING AND ROCKER ACTUATED CONTACTS --. Column 5, line 24, "normaly" should read -- normally --.

Signed and sealed this 20th day of October 1970.

(SEAL)
Attest:

Edward M. Fletcher, Jr.                          WILLIAM E. SCHUYLER, JR.
Attesting Officer                                      Commissioner of Patents